UNITED STATES PATENT OFFICE.

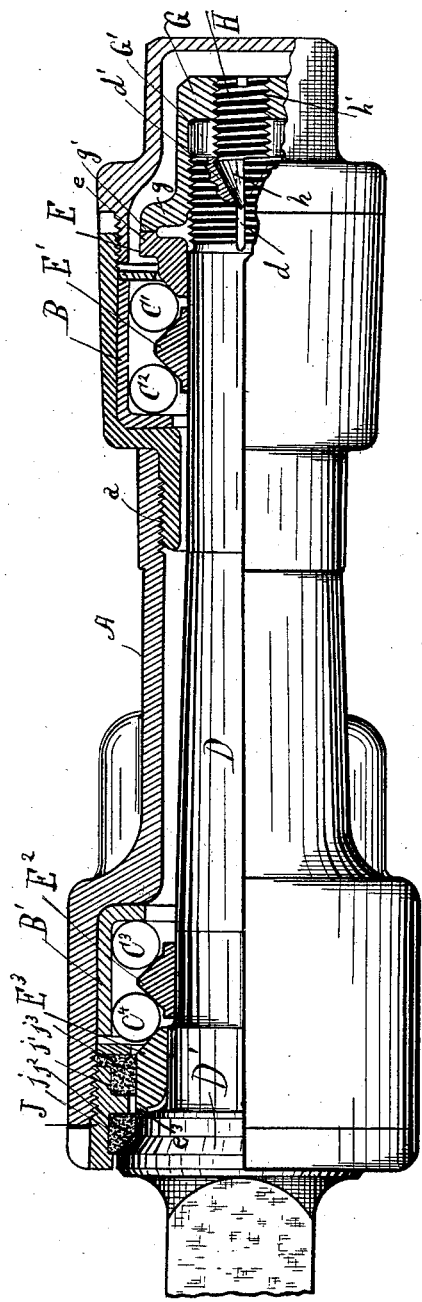

WALTER C. BAKER, OF CLEVELAND, OHIO.

ANTIFRICTION-BEARING.

SPECIFICATION forming part of Letters Patent No. 609,648, dated August 23, 1898.

Application filed January 31, 1898. Serial No. 668,595. (No model.)

*To all whom it may concern:*

Be it known that I, WALTER C. BAKER, of Cleveland, Cuyahoga county, Ohio, have invented certain new and useful Improvements in Antifriction-Bearings; and I do hereby declare the following to be a full, clear, and exact description of the invention, such as will enable others skilled in the art to which it pertains to make and use the same.

My invention relates to antifriction-bearings such as are used on vehicles.

My invention consists, first, in splitting the outer threaded end of the axle and providing the nut which engages the aforesaid threaded end with an adjustable wedge which by engaging the split in the end of the axle acts to spread the end and tighten the fit of the threads, preventing loosening or turning after the nut is adjusted.

My invention also consists in other details of construction, which will hereinafter appear.

The drawing illustrates an antifriction-bearing embodying my invention, showing the same in side elevation, half in section.

Referring to the drawing, A represents the sleeve of the bearing. The sleeve A is preferably formed in two sections united by a screw-thread, as at $a$, and forms the bushing for the wheel-hub.

B B' represent hard-metal ball-cups which provide the ball-races of the bearing. The ball-cups B B' are inside of the sleeve A and are located, respectively, at each end thereof. The ball-cups are placed in sleeve A snugly, but in such a manner as to allow them to be easily removed. The longitudinal extensions of the ball-cups are each formed long enough to provide bearing-surface for at least two rows of balls $C'$ $C^2$ $C^3$ $C^4$.

D represents the axle or spindle, provided at its outer and inner ends with bearing-cones E E' and $E^2$ $E^3$, respectively. The cones E, E', $E^2$, and $E^3$ are so mounted on the axle or spindle D as to fit snugly, but in such a manner as to allow them to revolve thereon and also allow them to move in a horizontal direction for adjustment.

The sleeve A, race-cup B B', balls $C'$ $C^2$ $C^3$ $C^4$, axle or spindle D, and cones E, E', $E^2$, and $E^3$, which sustain the load and form the bearing, may be of any suitable construction; but I prefer to construct and assemble them as illustrated and set forth.

At the outer or threaded end of the axle or spindle D, I provide a slit $d$, or, in other words, I split the axle or spindle at $d$. I also provide a conical recess $d'$ at the outer end of the slot $d$.

G represents a nut which is screw-threaded internally, so as to engage the screw-thread on the end of the axle or spindle. The nut G is provided with a recess G', located beyond the screw-thread. This recess G' is formed larger in diameter than the outer diameter of the internal screw-thread of the nut and allows the nut to be adjusted. The nut G is provided at its inner end with a flange $g$, which in turn is provided with an annular projection $g'$, adjusted to engage the outer cone E'. The projection $g'$ is formed narrow, and hence is easily surfaced or made true.

H represents an adjustable screw-wedge, which is pointed and formed conical at one end $h$ and provided at the opposite end with means, such as a slit, whereby it may be operated. The wedge H is screw-threaded and engages a screw-thread $h'$, formed in the nut G, and its pointed end enters the conical recess $d'$. As the screw-wedge is advanced it will be seen that the threaded end of the axle or spindle will be enlarged circumferentially and thus the nut G be tightened thereon.

J represents an annular dust collar or ring which is screw-threaded into the inner end of the sleeve A. The collar J is provided with annular packing-pockets $j$ and $j'$, adapted to receive and retain annular packing-rings $j^2 j^3$, of elastic material, such as felt or the like. The packing-ring $j^2$ is so shaped as to conform to the collar D' of the axle and form in connection therewith a dust and water proof joint at this portion of the bearing. The packing-ring $j^3$ is adapted to rest on the bearing-cone $E^3$, and thus forms an auxiliary protection against the entrance of dust or water into the bearing. The packing-rings $j^2$ and $j^3$ are preferably saturated or "soaked" with paraffin or analogous substance, rendering them waterproof.

By providing the bearing with two annular packing-rings, as above set forth, I furnish an antifriction-bearing which is both dust-proof and waterproof and a bearing into which water cannot be forced, nor can it percolate into the bearing between the bearings of the moving parts.

It will be noticed that the cones E and $E^3$ are provided at their vertical faces with narrow annular flanges $e$ $e^3$, respectively. The object of providing the narrow annular flange $e$ or $e^3$ is to obviate the necessity of grinding or surfacing a broad face, and thus obtain a true working surface in less time than where the whole vertical surface has to be "trued."

The adjustment of the bearings is accomplished through the nut G, which bears against the cone E. The screw-threaded wedge H performs two functions—viz., a means for tightening the nut G and also the function of a gage to determine the position of said nut in relation to the axle or spindle D and the cone and balls.

What I claim is—

1. In an antifriction-bearing, the combination with an axle or spindle having a slit at its end, adjustable bearing-cones, antifriction-balls, and an outer casing, of an adjusting-nut threaded to engage the threaded end of the axle or spindle, and having a flange bearing against one of the cones, and a head internally recessed, and provided with a central threaded opening, and a screw passing through the opening in the head of the nut, and provided at its inner end with a wedge adapted to enter the slit in the spindle.

2. In an antifriction-bearing, the combination with an axle or spindle having a slit and a conical recess at its end, adjustable bearing-cones, antifriction-balls, and an outer casing, of an adjusting-nut threaded to engage the threaded end of the spindle, and having an annular flange bearing against the adjacent bearing-cone and a head internally recessed, and provided with a central threaded opening, and a screw passing through the opening in the head of the nut and provided at its inner end with a wedge fitting the conical recess in the end of the spindle.

3. In an antifriction-bearing, the combination with the spindle threaded at its outer end, and slitted and recessed, of adjustable cones and antifriction-balls, an adjusting-nut provided with an annular flange bearing against the outer cone, and having an internally-recessed head, provided with an internally-threaded opening, and a screw engaging the threads of the threaded opening and having a wedge at its inner end entering the recess at the end of the spindle, said wedge-screw being adjustable and removable independently of the nut.

Signed by me, at Cleveland, Ohio, this 26th day of January, 1898.

WALTER C. BAKER.

Witnesses:
J. L. WARD HOOVER,
DANIEL E. DALY.